(12) United States Patent
Marr et al.

(10) Patent No.: US 9,032,198 B1
(45) Date of Patent: *May 12, 2015

(54) MANAGEMENT OF COMPONENTS IN A HOSTING ARCHITECTURE

(75) Inventors: Michael David Marr, Monroe, WA (US); Matthew D. Klein, Seattle, WA (US); Samuel J. McKelvie, Seattle, WA (US); Darin Lee Frink, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 476 days.

This patent is subject to a terminal disclaimer.

(21) Appl. No.: 13/409,647

(22) Filed: Mar. 1, 2012

(51) Int. Cl.
*G06F 9/00* (2006.01)
*G06F 15/177* (2006.01)
*G06F 9/44* (2006.01)
*G06F 9/445* (2006.01)

(52) U.S. Cl.
CPC .......... *G06F 9/4401* (2013.01); *G06F 9/44505* (2013.01); *G06F 15/177* (2013.01); *G06F 9/4411* (2013.01)

(58) Field of Classification Search
USPC ........................................................ 713/1, 2
See application file for complete search history.

(56) References Cited

U.S. PATENT DOCUMENTS

| | | | |
|---|---|---|---|
| 6,581,162 B1 | 6/2003 | Angelo et al. | |
| 7,069,452 B1 | 6/2006 | Hind et al. | |
| 7,953,913 B2 | 5/2011 | Perry et al. | |
| 8,078,861 B1 | 12/2011 | Jarrett, Jr. et al. | |
| 8,561,058 B2 * | 10/2013 | Laska et al. | 717/175 |
| 2005/0262226 A1 | 11/2005 | Holloway et al. | |
| 2006/0020779 A1 | 1/2006 | Rothman et al. | |
| 2008/0168264 A1 | 7/2008 | Sebastian et al. | |
| 2010/0138521 A1 | 6/2010 | Dehaan et al. | |
| 2013/0007437 A1 | 1/2013 | Shroni et al. | |

* cited by examiner

*Primary Examiner* — Zahid Choudhury

(74) *Attorney, Agent, or Firm* — Knobbe, Martens, Olson & Bear, LLP

(57) ABSTRACT

A service provider can maintain one or more host computing devices which may be utilized as bare metal instances by one or more customers of the service provider. Illustratively, each host computing device includes hardware components that are configured in a manner to allow the service provider to implement one or more processes upon a power cycle of the host computing device and prior to access of the host computing device resources by customers. In one aspect, a hosting platform includes components arranged in a manner to limit modifications to software or firmware on hardware components. In another aspect, the hosting platform can implement management functions for establishing control plane functions between the host computing device and the service provider that is independent of the customer. Additionally, the management functions can also be utilized to present different hardware or software attributes of the host computing device.

29 Claims, 9 Drawing Sheets

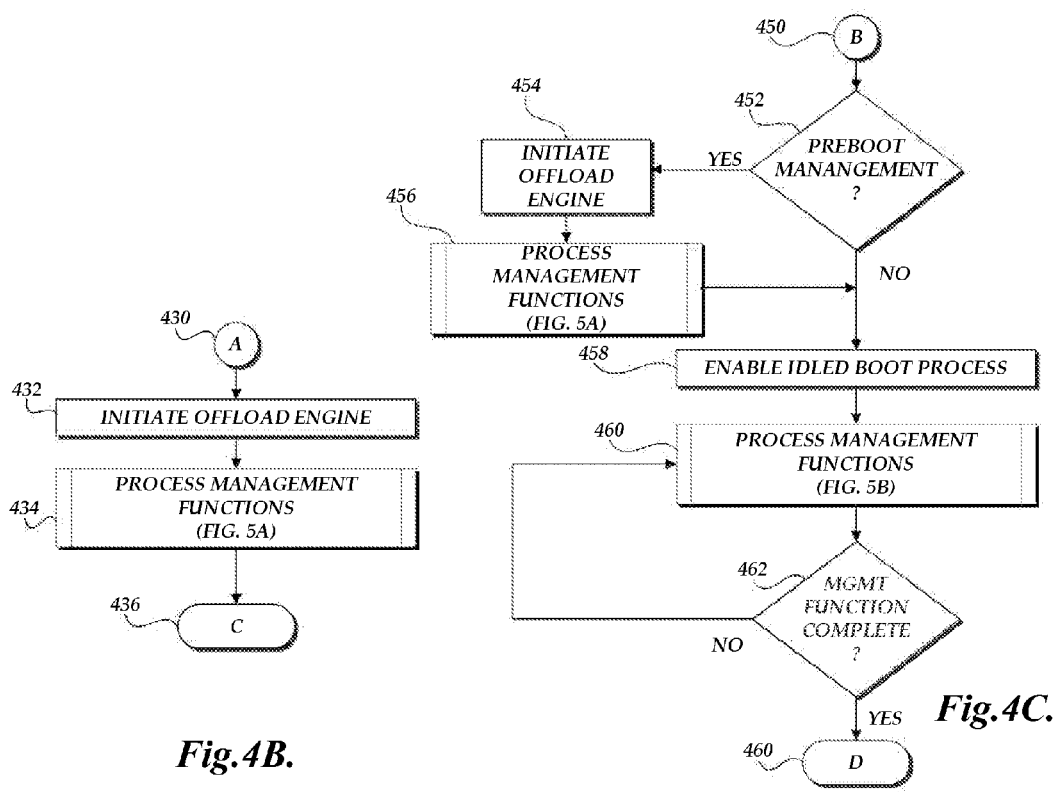

MANAGEMENT OF COMPONENTS IN A HOSTING ARCHITECTURE

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies may allow a single physical computing device to host one or more instances of virtual machines that appear and operate as independent computing devices to users of a data center. With virtualization, the single physical computing device can create, maintain, delete, or otherwise manage virtual machines in a dynamic manner. In turn, users can request computer resources from a data center, including single computing devices or a configuration of networked computing devices, and be provided with varying numbers of virtual machine resources.

In some cases, customers may want special hardware or full access to specific computing device resources provided in a data center. However, such access comes with risks for service providers of those resources. Specifically, in a shared environment, such as a data center, there typically will be other users sharing common computing resources at various times or subsequently using previously access resources. Accordingly, a modification or manipulation of a resource by one customer, whether intentional, unintentional, or malicious, can potentially be detrimental to subsequent customers.

BRIEF DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein:

FIGS. 4B and 4C are flow diagram illustrating embodiments for a host management subroutine implemented by a host computing device.

DETAILED DESCRIPTION

Figure 1:
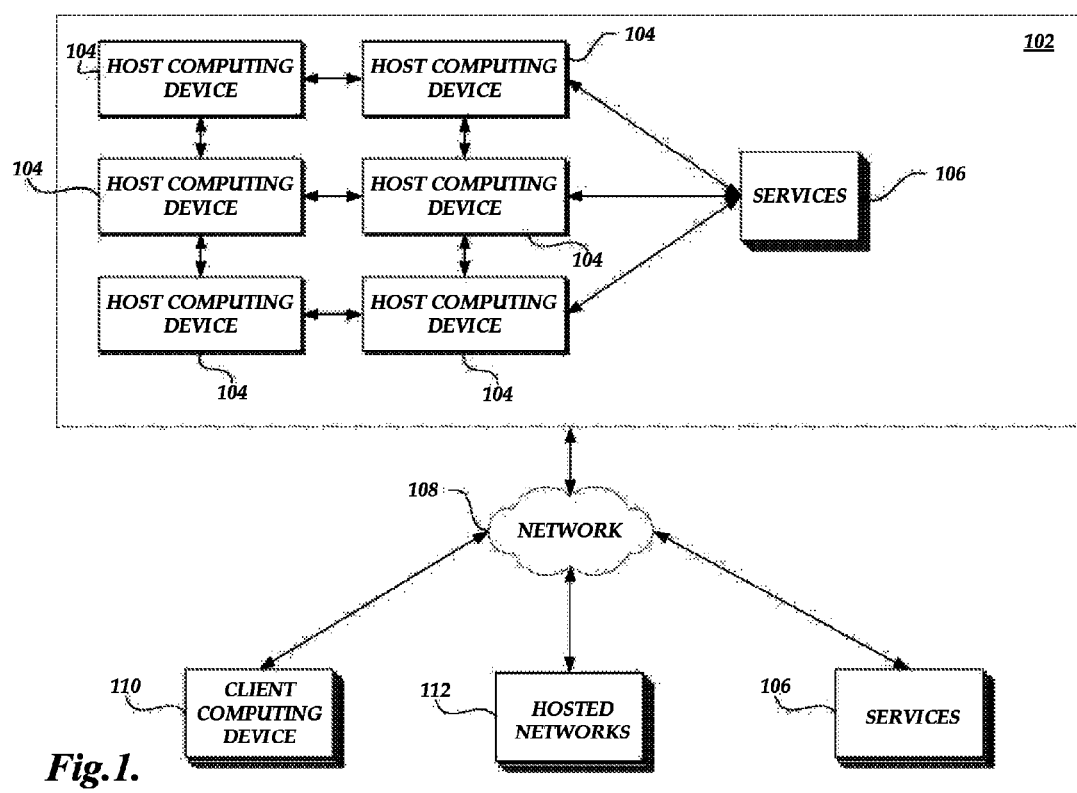
FIG. 1 is a block diagram depicting an illustrative environment for managing host computing devices including a number of hosted computing devices, client computing devices and networks and network-based services.

Generally described, the present application relates to systems and methods for granting a user or customer with substantially full access to at least a subset of hardware resources associated, or otherwise provided by, a service provider. This native-level access to remote hardware can be provided for resources such as servers, hosts, and cluster instances, for example. For resources such as cluster instances, customers may have native access to a subset of the hardware resources, such as may include peripheral devices connected using a component such as a peripheral component interconnect ("PCI") bus. These peripheral devices can include network interface cards (NICs), graphics processing units ("GPUs"), and similar devices that would often be virtualized in a hosted computing environment. In the some cases, a customer might have full access to an entire machine, or groups of machines, including any or all devices incorporated therein. For a group of machines such as a rack of servers, a user might be granted substantially full access to the entire rack, including any switches or other devices or components provided as part of the rack. Such embodiments can be generally referred to as "bare metal" instances.

In accordance with an illustrative embodiment, a service provider can maintain one or more host computing devices which may be utilized as bare metal instances by one or more customers of the service provider. Illustratively, each host computing device includes hardware components that are configured in a manner to allow the service provider to implement one or more management processes upon a power cycle of the host computing device and prior to access of the host computing device resources by customers. In one aspect, the present disclosure relates to an offload engine component, baseboard management component and various hardware latches arranged in a manner to limit modifications to software or firmware on hardware components, such as System Basic Input/Output System ("SBIOS"), hard drives and hard driver controllers, peripherals, and the like. In another aspect, the present disclosure relates to management functions for establishing control plane functions between the host computing device and the service provider that is independent of the customer processes that will be subsequently executed on the host computing device. Additionally, the management functions can also be utilized to present different hardware or software attributes of the host computing device.

While specific embodiments and example applications of the present disclosure will now be described with reference to the drawings, these embodiments and example applications are intended to illustrate, and not limit, the present disclosure. Specifically, while various embodiments and aspects of the present disclosure will be described with regard to illustrative components of host computing device, one or more aspects of the present disclosure can be applied with regard to different types or configurations of physical computing devices or combinations thereof.

FIG. 1 is a block diagram illustrating an embodiment of host computing device environment 100. The host computing device environment 100 includes a virtual network 102 that includes multiple physical computing devices, generally referred to as host computing devices 104. Illustratively, each host computing device 104 includes a number of hardware and software components, examples of which will be described, in part, with regard to FIG. 2. Additionally, in some embodiments, one or more of the host computing devices 104 are capable of hosting multiple virtual machine instances. At least some of the virtual machine instances may be provisioned to implement portions of a hosted network or to simulate one or more components of a hosted network. Illustratively, the virtual machine instances may be configured to provide specific functionality associated with the components of the hosted network or simulation of the components of the hosted network. Examples of the types of desired functionality, include but are not limited to: database management, serving or distributing data or content (e.g., Web servers), managing load balancing or network resources, managing network connectivity or security, providing network addressing information, managing client or server redirection, or any other functionality associated with a data center. Additionally, one or more virtual machine instances may be provisioned generically when a desired functionality is not specified or is otherwise not available. One skilled in the relevant art will appreciate that the virtual network 102 is logical in nature and can encompass host computing devices 104 from various geographic regions.

The virtual network 102 also includes one or more network based services 106 for managing the implementation of changes to host computing devices 104. Illustratively, the network based services 106 can functionality to one or more of the host computing devices 104, either for the benefit a service provider, customer, third party or a combination thereof. For example, the network-based services 106 can include security services related to the management of communications, encryption of content, etc. In another example, the network-based services 106 can include a provisioning service related to the establishment or configuration of operating environments, software applications, software updates, software configurations that will be executed by a customer on a host computing device 104. In a further example, the network-based services 106 can also include financial and accounting services related to the management of financial transaction information between customers and the service provider based on utilization of the host computing devices. Additional or alternative network-based services may also be contemplated. Additionally, although the network-based services 106 are described as being integrated in the virtual network, one or more network-based services may be implemented external to the virtual network 102 as also illustrated in FIG. 1.

With continued reference to FIG. 1, connected to the virtual network 102 via a network 108 are multiple client computing devices 110. The network 108 may be, for instance, a wide area network (WAN), a local area network (LAN), or a global communications network. In some instances, the client computing devices 110 may interact with the virtual network 102 to request the allocation of one or more hosted computing devices 104 on behalf of a customer. Additionally, the virtual network 102 may be integrated with other hosted client computing networks 112. As previously described, in some embodiments, one or more of the network-based services 102 may be separate from the virtual network 102.

Figure 2A:
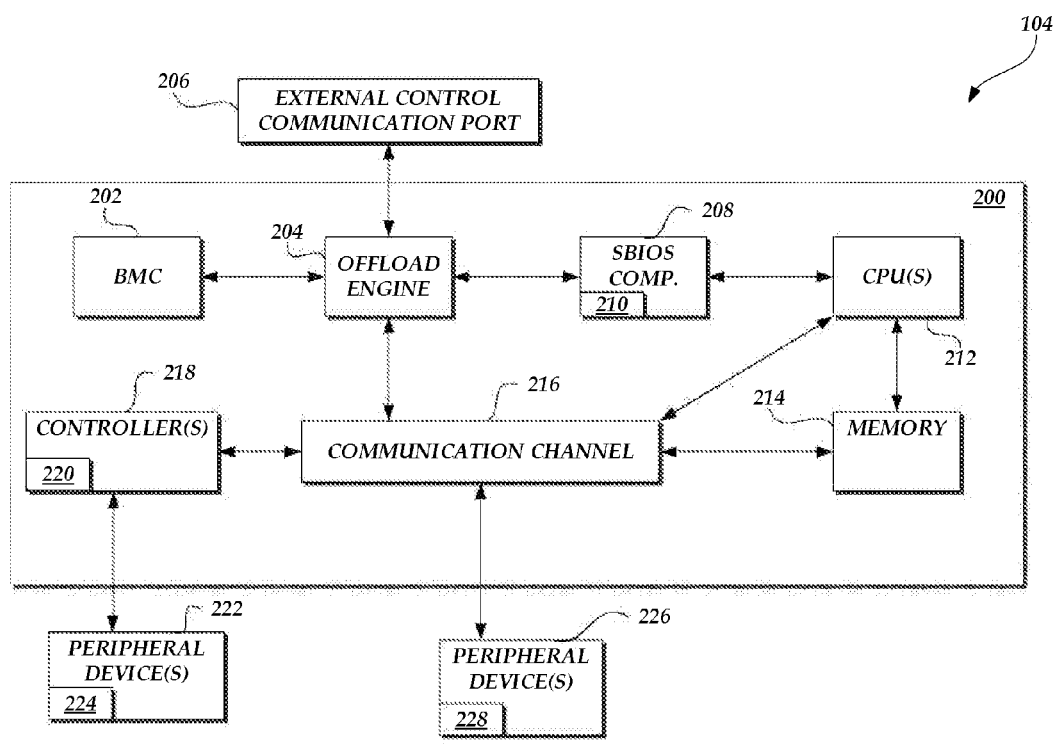
FIGS. 2A and 2B are block diagrams depicting various embodiments corresponding to illustrative components and configurations of a host computing device.

With reference now to FIG. 2A, a block diagram depicting illustrative components associated with a host computing device 104 will be described. However, one skilled in the relevant art will appreciate that the disclosed illustrative components are not meant to be an exhaustive identification of all the components required by a host computing device 104. Rather, illustrative components have been identified, in a non-limiting manner, to facilitate illustration of one or more aspects of the present application. Still further, the illustrative components of the host computing device 104 can be considered logical in nature such that the physical implementation of one or more components can be varied or such that one or more of the logical components may be implemented in a virtualized manner. Additionally, one or more host computing devices 104 can share one or more of the illustrated components, such as processors, graphical processing units, memory and the like.

In an illustrative embodiment, each host computing device is associated various hardware components, software components and respective configurations that facilitate the implementation of host computing device boot process, which will be described in detail below. Specifically, in one embodiment, the host computing devices 104 include a bare metal hosting platform 200 for managing various functions associated with bare metal host computing devices. The bare metal hosting platform 200 can include a Baseboard Management Controller ("BMC") 202 for managing the operation of the host computing device in accordance with the Intelligent Platform Management Interface ("IPMI"). Specifically, the BMC 202 can include an embedded microcontroller that manages the interface between system management software and host computing device 104 host computing device 104 components.

In communication with the BMC 202 is an offload engine component 204. In one aspect, the offload engine component 204 can communicate as a standard bridge component for facilitating access between various physical and emulated components and a communication channel component 216. In another aspect, the offload engine component 204 can include embedded microprocessors to allow the offload engine component to execute computer-executable instructions related to the implementation of management functions or the management of one or more such management functions, or to execute other computer-executable instructions related to the implementation of the offload engine component. Illustratively, the BMC 202 is configured in such a way to be electrically isolated from any other component in the bare metal hosting platform 200 other than the offload engine component 204.

Also in communication with the offload engine component 204 is an external communication port component 206 for establishing communication channels between the bare metal hosting platform 200 and one or more network-based services or other computing devices. Illustratively, the external communication port component 206 can corresponds to a communication channel implemented in accordance with The Onion Router ("TOR") communication protocol and scheme. As will be described in greater detail below, the offload engine component 204 can utilize the external communication port component 206 during the boot process. Additionally, the offload engine component 204 can utilize the external communication port component 206 to maintain communication channels between one or more services and the host computing devices 104, such as health check services, financial services, and the like.

The offload engine component 204 is also in communication with an SBIOS component 208. Illustratively, the SBIOS component 208 includes non-transitory executable code, often referred to as firmware, that is executed by one or more processors and is used to cause components of the host computing device 104 to initialize and identify system devices such as the video display card, keyboard and mouse, hard disk drive, optical disc drive and other hardware. The SBIOS component 208 can also include or locate boot loader software that will be utilized to boot the host computing device 104. As will be explained below, in one embodiment, the SBIOS component 208 can include executable code that, when executed by a processor, causes the host computing device to attempt to locate PXE boot software. Additionally, the SBIOS component 208 includes or takes the benefit of a hardware latch 212 that is electrically controlled by the offload engine component 204. The hardware latch 212 restricts access to one or more aspects of the SBIOS component 208, such controlling modifications or configurations of the executable code maintained in the SBIOS component 208.

With continued reference to FIG. 2A, the SBIOS component 208 is connected (or in communication with) a number of additional computing device resources components, such as central processing units ("CPUs") 212, memory 214 (e.g., RAM), and the like. In one embodiment, such computing device resource components may be physical computing device resources in communication with other components via the communication channel 216. Illustratively, the communication channel 216 can correspond to a communication bus, such as PCI bus in which the components of the bare metal hosting platform 200 communicate in accordance with the PCI standards. Other types of communication channels, communication media, communication buses or communication protocols (e.g., the Ethernet communication protocol) may also be utilized. Additionally, in other embodiments, one or more of the computing device resource components may be virtualized hardware components emulated by the host computing device 104. In such embodiments, the offload engine component 204 can implement a management process in which a host computing device is configured with physical or emulated hardware components based on a variety of criteria. The computing device resource components may be in communication with the offload engine component 204 via the communication bus 216.

Also in communication with the offload engine component 204 via the communication channel 216 are one or more controller components 218 for managing hard drives or other forms of memory. An example of a controller component 218 can be a SATA hard drive controller. Similar to the SBIOS component 208, the controller components 218 includes or takes the benefit of a hardware latch 220 that is electrically controlled by the offload engine component 204. The hardware latch 220 restricts access to one or more aspects of the controller component 218. Illustratively, all the hardware latches (e.g., hardware latch 210 and hardware latch 220) may be controlled together or independently. For example, the offload engine component 204 may selectively close a hardware latch for one or more components based on a trust level associated with a particular customer. In another example, the offload engine component 204 may selectively close a hardware latch for one or more components based on a trust level associated with an author or distributor of the executable code to be executed by the offload engine component. In a further example, the offload engine component 204 may selectively close a hardware latch for one or more components based on a trust level associated with the component itself.

The host computing device 104 can also include additional components that are in communication with one or more of the illustrative components associated with a bare metal hosting platform 200. As illustrated in FIG. 2, such components can include devices, such as one or more controllers 218 in combination with one or more peripheral devices 222, such as hard disks or other storage devices. Additionally, the additional components of the bare metal hosting platform 200 can include another set of peripheral devices 226, such as Graphics Processing Units ("GPUs"). Illustratively, the peripheral devices 222 and 226 can also be associated with hardware latches 224 and 228 for restricting access to one or more aspects of the component. As mentioned above, in one embodiment, the hardware latches (e.g., hardware latches 210, 220, 224, and 228 may be controlled together or independently.

Figure 2B:
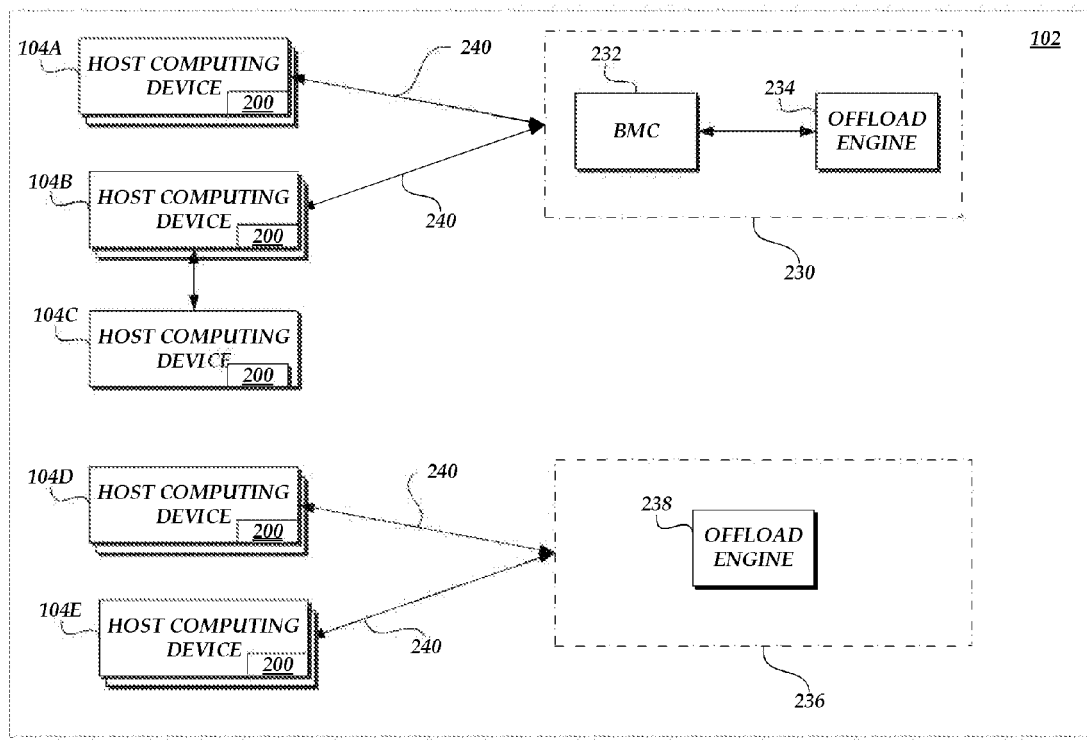

Turning now to FIG. 2B, in an illustrative embodiment, one or more components of a bare metal hosting platform may be shared among host computing devices 104. Illustratively, each host computing device 104 can include one or more components of a bare metal hosting platform, as illustrated at 200. However, in one example, a set of host computing devices 104A and 104B are in communication with an external component 230 that includes a BMC component 232 and offload engine component 234. In this example, the BMC component 232 and offload engine component 234 would perform at least a subset of the functions previously described with regard to the bare metal host platform 200 (FIG. 2A). As illustrated in FIG. 2B, a set of host computing devices 104C may not utilize the BMC component 232 and offload engine component 234 of the external component 230 even if the set of host computing devices 104C is in communication with the set of host computing devices 104B. Illustratively, the BMC component 232 and offload engine component 234 may be implemented in a manner such that individual host computing devices (e.g., 104A) do not need a corresponding local BMC component or offload engine component. Alternatively, the BMC component 232 and offload engine component 234 may be redundant to any local BMC component or offload engine component or work in conjunction with a local BMC component or offload engine component.

By way of another illustrative example, a set of host computing devices 104D and 104E are in communication with an external component 236 that includes only an offload engine component 238. In this example, the offload engine component 238 would have to be in communication with a BMC component that would be local to the host computing devices 104D and 104E or otherwise shared by the host computing devices 104D and 104E. Illustratively, the external components 230 and 236 may establish communication with the set of host computing devices 104 via a variety of communication media 240 implementing one or more communication protocols. Additionally, the external components 230 236 may also implement or incorporate additional or alternative security methodologies, architectures or protocols with regard to communications with the host computing devices 104.

The external components 230, 236 illustrated in FIG. 2B are illustrated logically in nature and may be actually implemented remotely from the host computing devices 104 or implemented in a distributed manner such that there would be multiple instances of the external components. Additionally, while the external components 230, 236 illustrated in FIG. 2B correspond to a shared BMC component and offload engine component, additional components may be also be shared by one or more host computing devices 104 as previously discussed.

Figure 3A:
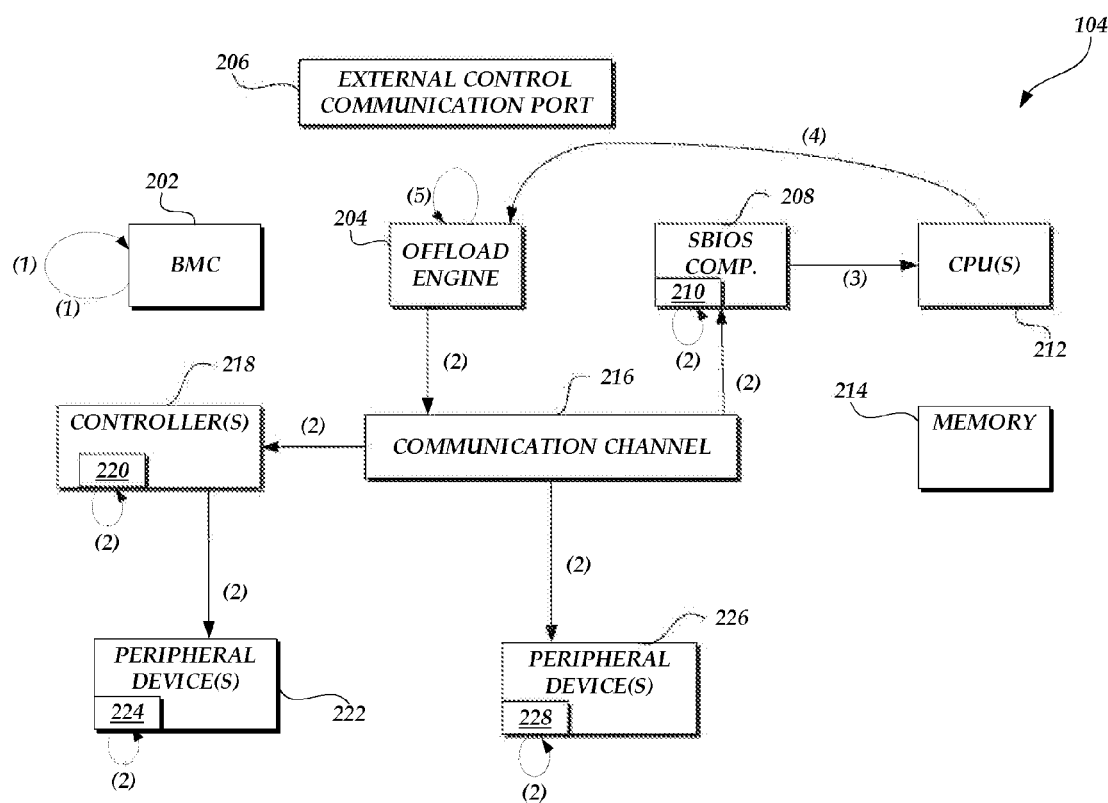
FIGS. 3A-3C are simplified block diagrams of the illustrative components of the host computing device of FIG. 2 illustrating the initiated of a boot process procedure.
Figure 3B:
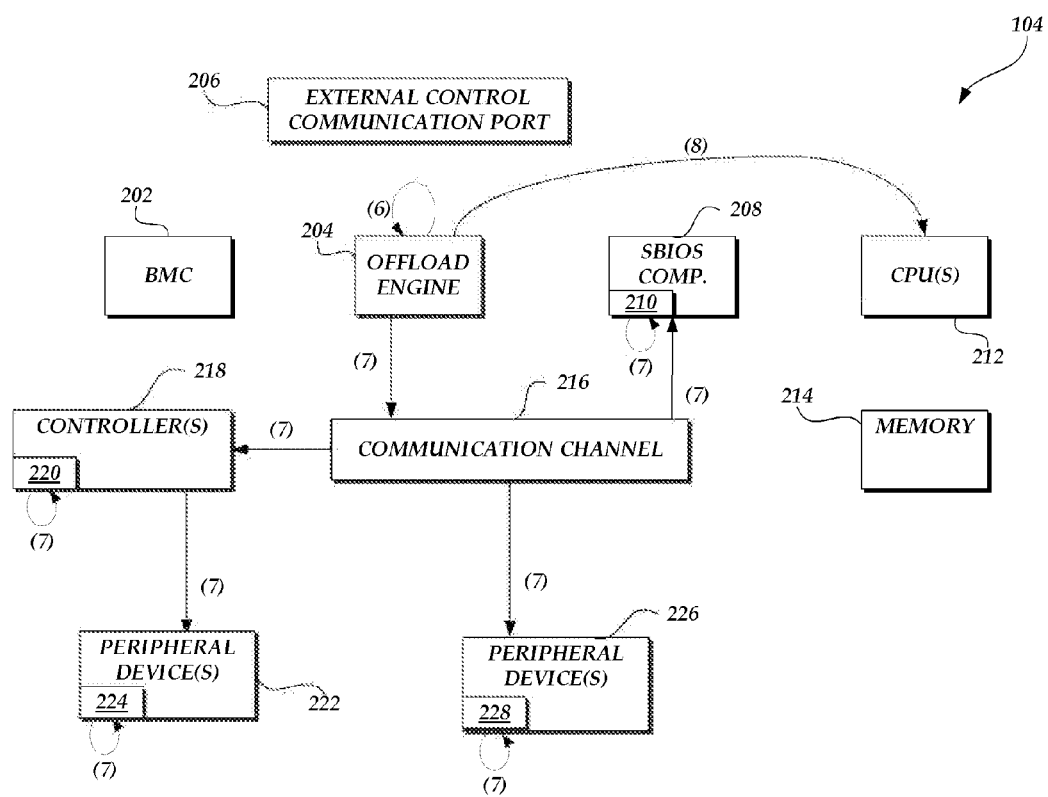
Figure 3C:
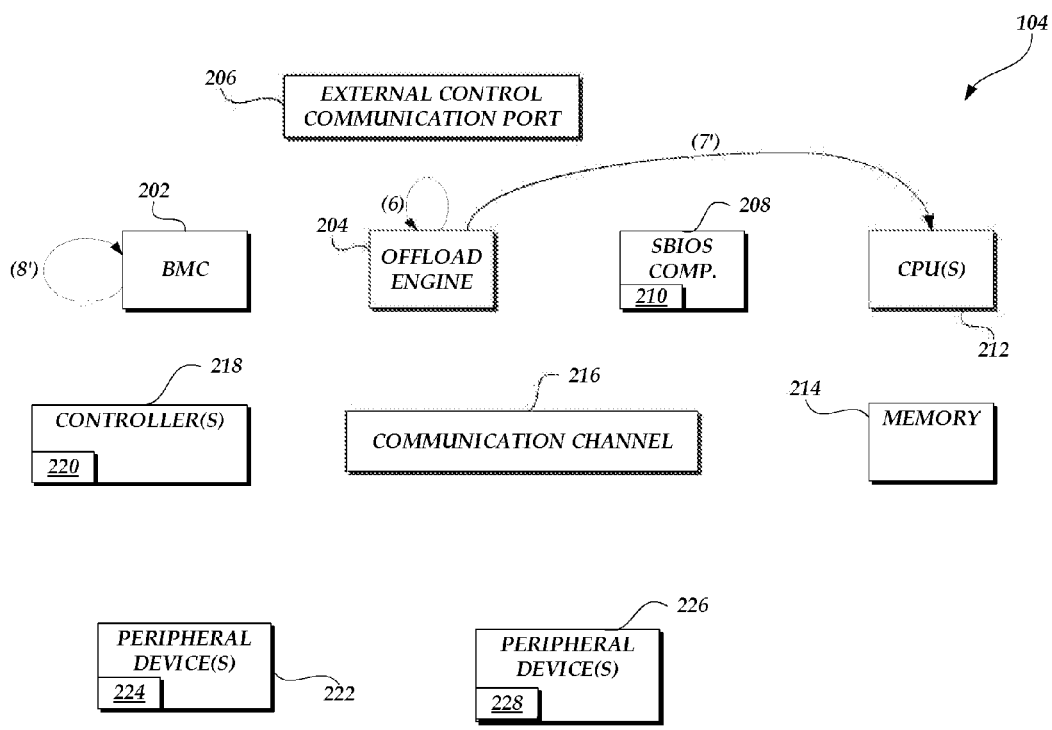

With reference now to FIGS. 3A-3C, simplified block diagrams of the bare metal hosting platform 200 of FIG. 2 will be utilized to illustrate a boot process implemented by a host computing device 104. With reference to FIG. 3A, at (1), the boot process begins by a power cycle initiated by the BMC 202. The power cycle may be part of the completion of the utilization of the host computing device 104 by a previous customer, the determination that host computing device 104 may need to be re-provisioned or re-configured, by the completion of an update process, and the like.

As part of the power cycle initiation (or upon completion of one or more identified processes), at (2), the offload engine component 204 (or other component) manipulates all the hardware latches such that modifications may be made to one or more components associated with the hardware latch. For example, the offload engine component 204 can transmit a signal such that a hardware latch, such as hardware latch 210, may be closed to allow the SBIOS component 208 to be placed in a state in which data can be written to the SBIOS component or that data previously maintained by the SBIOS component can be modified or replaced. As previously mentioned, the offload engine component 204 can select one or more hardware latches that will be manipulated independently of one another or control all the hardware latches together. Additionally, in one embodiment, the hardware latches can be sufficiently hardened or implemented in a way to mitigate the possibility that the latches could be manipulated by external components.

At (3), the CPU 212 communicates with the SBIOS component 208 to obtain executable code and attempts to implement a boot process, such as a PXE boot. At (4), the offload engine component is configured to present itself as a boot device, such as a NIC, such that the CPU 212 attempts to implement the boot process through the offload engine component 204. At (5), the offload engine component 204 delays the implementation of the requested boot process. For example, the offload engine component can include an option Read Only Memory ("ROM") process that results in a delay until the intended boot process is ready to be implemented. In another example, the offload engine component 204 can calculate or implement a timed delay process to allow sufficient time for one or more management functions to be implemented prior to proceeding with the boot request.

With reference to one illustrative in FIG. 3B, at (6), the offload engine component 204 initializes its embedded microprocessors and begins executing one or more management functions. Illustratively, in one embodiment, the offload engine component 204 can execute code that causes the offload engine component to implement one or more management functions. In another embodiment, the offload engine component 204 can initiate one or more services or communicate with other computing devices that implement executable code corresponding to one or more management functions. For example, offload engine component 204 can utilize one or more services 206 that are implemented in accordance with an Application Programming Interface ("API") based on authorization provided by the offload engine component. For purposes of describing illustrative management functions, however, the management functions will be described as implemented by the offload engine component 204.

In one aspect, the offload engine component 204 can execute code that relates to the establishment of a management control communication channel, such as via the external control communication port 206. In another aspect, the offload engine component 204 can modify or replace software or software configurations associated with one or more components in which a hardware latch permits modification. In a further aspect, the offload engine component 204 can implement various security or authentication schemas. In still another aspect, the offload engine component 204 can initiate a reconfiguration, cleanup, or examination of the computing device resources to ensure that such resources are available for use.

In addition to the management functions, the offload engine component 204 can also implement one or more processes for preparing the host computing device 104 for use with the customer specified request. In one aspect, the offload engine component 204 can enable one or more physical or emulated hardware components for utilization. For example, assume a host computing device 104 includes four processing units that are capable of being utilized, but a customer has only indicated they would utilize two processing units. The offload engine component 204 can then enable only two of the processing units responsive to the request. In another aspect, the offload engine component 204 can initiate one or more processes that will be run by the service provider during the time the host computing device 104 resources are being utilized by a customer. For example, the processes can include a health check module for determining the relative health/operation of the host computing device 104. In still a further aspect, the offload engine component 204 can then prepare for the target boot process to be initiated by the CPU 212.

With continued reference FIG. 3B, prior to allowing the host computing device 104 to begin executing code or communicating with untrusted or unsecured components, at (7) the offload engine component 204 (or other components) the offload engine component 204 can transmit a second signal that causes a manipulation of the hardware latches to prevent further modification to any associated components. For example, hardware latches may be set to an open position to prevent modification of firmware. At (8), the boot process is unblocked and the host computing device 104, through the CPU 212, begins the intended boot process, such as a bare metal boot process. At any point, the process illustrated in FIGS. 3A and 3B may be repeated based on a power cycle implemented by the BMC component 202 or upon termination/expiration of the use by the customer.

In an alternative to the process illustrated in FIG. 3B, in FIG. 3C, at (6') the offload engine 204 can determine that executable code corresponding to the boot process may be associated with a sufficient level of trust. In one embodiment, the offload engine component 204 unblocks the delayed boot process at (7'). As such, the host computing device 104, through the CPU 212, begins the intended, trusted boot process. During the intended, boot process, the executable code obtained during the boot process can be executed to implement one or more of the management functions illustrated with regard to FIG. 3B. In this embodiment, however, the offload engine component 204 can cause one or more of the hardware latches to remain closed after the boot process to facilitate the management function. Thereafter, the BMC component 202 can initiate a power cycle that will result in the repeat of the process illustrated in FIG. 3A. Additionally, in an alternative embodiment, prior to unblocking the delayed boot process, the offload engine component 204 can implement at least a portion of the pre-boot management interaction and processes discussed with regard to action (6) in FIG. 3B. In such an embodiment, the offload engine component 204 would proceed to unblock and implement the trusted boot code upon completion of some pre-boot management functions.

Figure 4A:
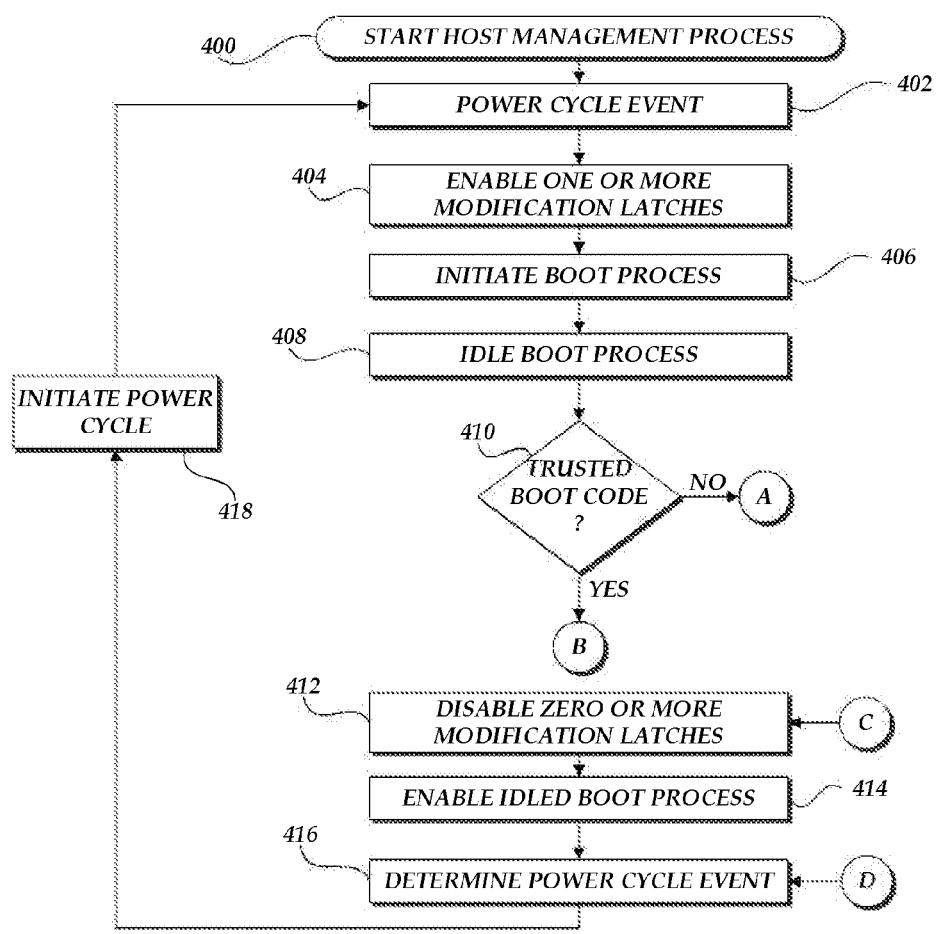
FIG. 4A is a flow diagram illustrating a host boot process routine implemented by a host computing device.

Turning now to FIG. 4A, a flow diagram illustrating a host boot process routine 400 implemented by a bare metal hosting platform 200 of a host computing device 104 will be described. In this regard, routine 400 will be described with regard to implementation by the bare metal hosting platform 200, which may include one or more components previously discussed with regard to the bare metal hosting platform. Such illustrations should not be construed as being limited to implementation by the illustrated components.

With reference to FIG. 4, at block 402, the bare metal hosting platform 200 begins by determining a power cycle, such as a power cycle initiated by the BMC 202. The power cycle may be part of the completion of the utilization of the host computing device 104 by a previous customer, the determination that host computing device 104 may need to be re-provisioned or re-configured, by the completion of an update process, and the like. Still further, in other embodiments, the power cycle can be initiated by a customer request or service provider request, if the BMC 202 (through the offload engine component 204) facilitates such interfaces. For example, the BMC 202 may be able to initiate a power cycle based on an API exposed to a client computing device 110.

At block 404, the offload engine component 204 (or other component) manipulates all the hardware latches such that modifications may be made to one or more components associated with the hardware latch. For example, the offload engine component 204 can transmit a signal such that a hardware latch, such as hardware latch 210, may be closed to allow the SBIOS component 208 to be placed in a state in which data can be written to the SBIOS component. As previously mentioned, the offload engine component 204 can control select hardware latches independently of one another or control all the hardware latches together. Additionally, in one embodiment, the hardware latches can be sufficiently hardened or implemented in a way to mitigate the possibility that the latches could be manipulated by external components. For example, the hardware latches may be configured such that they are in an open position by default and can only be closed in limited circumstances.

At block 406, the CPU 212 begins execution of the code in the SBIOS component 208 and attempts to implement a boot process, such as a PXE boot. As previously described, in one embodiment, because the offload engine component 204 is configured to present itself as a boot device the CPU 212 attempts to implement the boot process through the offload engine component 204. By way of example, the offload engine component 204 can present itself as a NIC via the communication bridge 216. At block 408, the boot process initiated by a CPU 212 is idled or delayed to allow the offload engine component 204 to complete its management functions or other functions prior providing control or executing code associated with untrusted components. For example, the offload engine component 204 can include one or more processes that delay the boot process, such as an option ROM process or delay process.

At decision block 410, the offload engine component 204 determines whether the boot code that has been idled has been associated with a sufficient level of trust. If the boot code has not been associated with a sufficient level of trust, the routine 400 proceed to block 430 (FIG. 4B) in which one or more pre-boot management processes will be implemented. If the boot code has been associated with a sufficient level of trust, the routine 400 proceeds to block 450 (FIG. 4C) in which one or more pre-boot management processes and one or more post-boot management processes may be implemented. Accordingly, the processing of management functions in routine 400 is illustratively dependent on a level of trust associated with the boot code to be implemented by the host computing device 104.

With continued reference to FIG. 4A, the routine 400 implements block 412 upon completion of a pre-boot management process, such as the pre-boot management process illustrated in FIG. 4B. Specifically, prior to allowing the host computing device 104 to begin executing code or communicating with untrusted or unsecured components, the offload engine component 204 (or other components) causes the manipulation of zero or more hardware latches to prevent further modification to any of their associated components. For example, hardware latches may be set to a "closed" position to prevent modification of firmware. In this embodiment, as will be explained in greater detail below, the offload engine component 204 assumes that the boot process is untrusted. Accordingly, at block 414, the idled boot process is enabled and the host computing device 104 begins the intended boot process, such as a bare metal boot process.

Upon enablement of untrusted boot code at block 414, the host computing device 104 implements the untrusted boot code and executes any additional code provided by a customer until a determination of a power cycle event. Additionally, in embodiments in which the idled boot code is associated with a sufficient trust level, routine 400 implements block 416 upon completion of a potential combination of pre-boot and post-boot management functions as illustrated in FIG. 4C. In either embodiment, the routine 400 does not continue until there is a determination of a power cycle event at block 416. For example, a power cycle event may be determined based on expiration of a time period allotted for customer utilization of the host computing device 104. In another example, a power cycle event may be based on determination of an error or fault condition. In a further example, a power cycle event may be determined based on communications, such as a power cycle initiated by a system administrator or requested by the customer. The routine then proceeds to block 418, in which the BMC component 202 initiates a power cycle. Accordingly, the routine 400 would then return to block 402 for processing of the power cycle event.

Turning now to FIG. 4B, a sub-routine for implementing a pre-boot host management subroutine 430 will be described. In one embodiment, the offload engine component 204 executes code or causes code to be executed that will implement one or more management functions. Accordingly, subroutine 430 begins with the initiation of the offload engine component at block 432, which can include the initialization of one or more embedded microprocessors, obtaining of executable code, communication with network services, and the like. At block 434, the offload engine component processes management functions. The implementation of management functions will be described below with regard to FIG. 5A. At block 436, once the management functions have been implemented, the subroutine 436 returns to block 412 (FIG. 4A). In this embodiment, it is assumed that the executable code associated with the boot process is not associated a sufficient trust level and that the hardware latches will be manipulated (e.g., opened) upon completion of the processing of the management function and prior to the enablement of the boot process.

Turning now to FIG. 4C, a sub-routine for implementing an alternative host management subroutine 450 will be described. Specifically, in this embodiment, the host computing device 104 may implement one or more pre-boot management processes and one or more post-boot management processes. In some embodiments, the offload engine component 204 does not necessarily have to execute any of the code that will implement one or more management functions. Rather, if the boot process is associated with a sufficient trust level, the boot process may be enabled such that one or more of the hardware latches will remain closed. In other embodiments, one or more pre-boot management processes may be implemented by the offload engine component 204 prior to initiating the idled, trusted boot process.

Accordingly, subroutine 450 begins at decision block 452 with a determination of whether the host computing device 104 will implement any pre-boot management processes. If so, at block 454, the offload engine component 204 is initiated, which can include the initialization of one or more embedded microprocessors, obtaining of executable code, communication with network services, and the like. At block 456, the offload engine component 204 processes one or more pre-boot management functions. The implementation of management functions will be described below with regard to FIG. 5A.

Once the host computing device 104 has implemented any pre-boot management processes at block 456 or if at decision block 452, the host computing device 104 does not implement any pre-boot management processes, at block 458 the offload engine component 204, alone or in conjunction with other components, enables the idled boot process that has been associated with a minimal trust level. At block 460, the host computing device 104 processes management functions based on the execution of the code associated with the trusted boot process. The implementation of management functions will be described below with regard to FIG. 5B. Illustratively, the post-management process may be independent of any pre-boot management process implemented at block 456. Alternatively, one or more post-boot management processes may be implemented based on the implementation or outcome of one or more pre-boot management processes at block 456.

At block 462, a test is conducted to determine whether the management function implementation is complete. If not, the subroutine returns to block 460. Once the management functions have been implemented, at block 460, the sub-routine terminates and returns to block 416 for determination a power cycle (FIG. 4A). As previously described, in this embodiment, it is assumed that the executable code associated with the boot process is associated a sufficient trust level and that the hardware latches will remain manipulated (e.g., closed) upon enablement of the boot process. As such, the host computing device 104 can reset the hardware latches by initiating a power cycle upon completion of the management function. Accordingly, the power cycle would result in a reset such that routine 400 would begin anew at block 402.

Figure 5A:
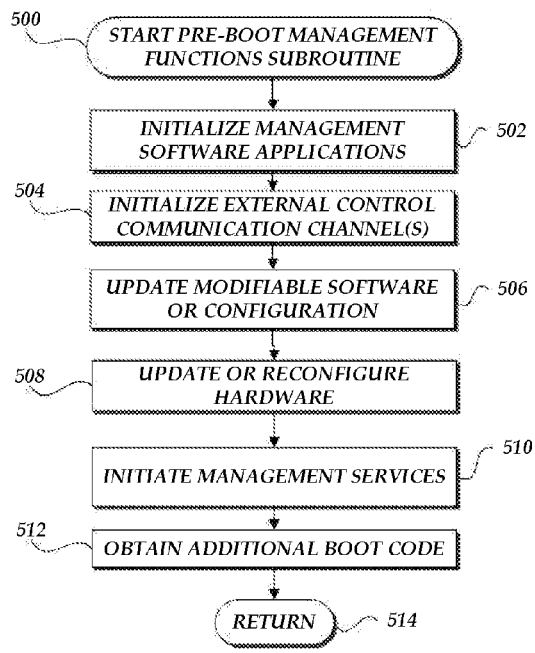
FIGS. 5A and 5B are flow diagram illustrative of embodiments of a host management process sub-routine implemented by a host computing device.

Turning now to FIG. 5A, a flow diagram illustrating a host boot process manage function subroutine 500 implemented by a bare metal hosting platform 200 of a host computing device 104 will be described. In this regard, subroutine 500 will be described with regard to implementation by the bare metal hosting platform 200 or the offload engine component 204, which may include one or more components previously discussed with regard to the bare metal hosting platform 200. Such illustrations should not be construed as being limited to implementation by the illustrated components. As previously described, aspects of subroutine 500 may be implemented at block 434 (FIG. 4B), which illustratively occurs prior to the disabling of the hardware latches (block 412). Additionally, aspects of subroutine 500 may be implemented at block 456 (FIG. 4C), which illustratively occurs prior to the enablement of a trusted, idled boot code. In such embodiments, the components executing the subroutine 500 may vary. Additionally, one or more specific blocks of subroutine 500 may be considered to optional and may be omitted as appropriate or selected.

At block 502, the offload engine component 204 initializes one or more software applications that will be utilized provide the management functions. For example, the offload engine component 204 can generate an update application that identifies a trusted source for update information and authenticates itself for obtaining the necessary update information. In another example, the offload engine component 204 can generate basic security functions that will be utilized to protect the operation of the bare metal hosting platform 200. Additional or alternative functions may be also be implemented.

At block 504, the offload engine component 204 component 204 can execute code that relates to the establishment of management control communication channel, such as via the external control communication port 206. As previously described, the bare metal hosting platform 200 can utilize a TOR connection to obtain control plane instructions for one or more components of the bare metal hosting platform 200. Additionally, the bare metal hosting platform 200 can establish and maintain multiple open communication channels based on anticipated need.

At block 506, the offload engine component 204 can modify or replace software or software configurations associated with one or more components in which a hardware latch permits modification. Illustratively, the offload engine component 204 can access memory for obtaining updates, software applications, etc. At block 508, the offload engine component 204 can initiate a reconfiguration, cleanup, or examination of the computing device resources to ensure that such resources are available for use. In one aspect, the offload engine component 204 can initiate a cleanup of data previously stored on hard disks 224. In another aspect, the offload engine component 204 can execute code that relates to the establishment of management control communication channel, such as via the external control communication port 206. In another aspect, the offload engine component 204 can modify or replace software associated with one or more components in which a hardware latch permits modification. In a further aspect, the offload engine component 204 can implement various security or authentication schemas. In still another aspect, the offload engine component 204 can initiate a reconfiguration, cleanup, or examination of the computing device resources to ensure that such resources are available for use.

At block 508, the offload engine component 204 can also implement one or more processes for preparing the host computing device 104 for use with the customer specified request. In one aspect, the offload engine component 204 can enable one or more physical or emulated hardware components for utilization. For example, assume a host computing device 104 includes four processing units that are capable of being utilized, but a customer has only indicated they would utilize two processing units. The offload engine component 204 can then enable only two of the processing units responsive to the request.

At block 510, the offload engine component 204 can initiate one or more processes that will be run by the service provider during the time the host computing device 104 resources are being utilized by a customer. For example, the processes can include a health check module for determining the relative health/operation of the host computing device 104. In still a further aspect, the offload engine component 204 can then prepare for the real boot process requested by the CPU 212. At block 512, the offload engine component 204 can obtain any additional boot code required for enabling a boot process. At block 514, subroutine 500 terminates.

Figure 5B:
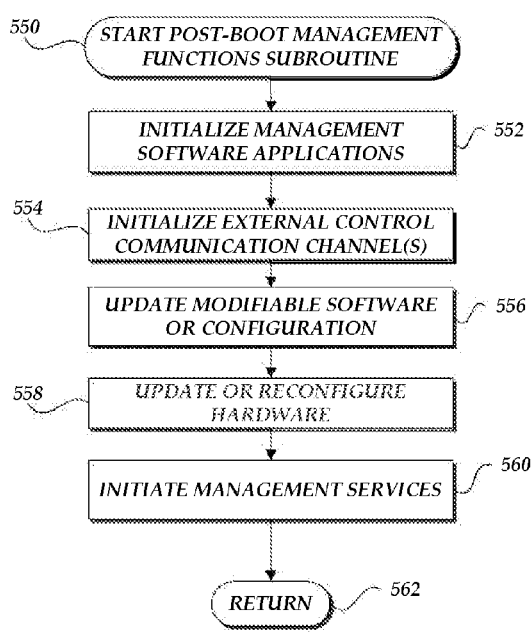

Turning now to FIG. 5B, a flow diagram illustrating a host boot process manage function subroutine 550 implemented by a host computing device 104 will be described. In this regard, subroutine 550 will be described with regard to implementation by the host computing device 104, which may include one or more components previously discussed with regard to the bare metal hosting platform 200. Such illustrations should not be construed as being limited to implementation by the illustrated components. As previously described, aspects of subroutine 550 may be implemented at block 460 (FIG. 4C), which illustratively occurs after the initiation of an idled boot process (block 458) and the optional processing of pre-boot management functions (block 456). Still further, subroutine 500 may be illustratively implemented prior to the disabling of the zero or more hardware latches (block 412 of FIG. 4A). One or more specific blocks of subroutine 500 may be considered to optional and may be omitted as appropriate or selected.

At block 552, the host computing device 104 initializes one or more software applications that will be utilized provide the management functions. For example, the host computing device 104 can generate an update application that identifies a trusted source for update information and authenticates itself for obtaining the necessary update information. In another example, the host computing device 104 can generate basic security functions that will be utilized to protect the operation of the bare metal hosting platform 200. Additional or alternative functions may be also be implemented.

At block 554, the offload engine component 204 component 204 can execute code that relates to the establishment of management control communication channel, such as via the external control communication port 206. As previously described, the bare metal hosting platform 200 can utilize a TOR connection to obtain control plane instructions for one or more components of the bare metal hosting platform 200. Additionally, the bare metal hosting platform 200 can establish and maintain multiple open communication channels based on anticipated need.

At block 556, the host computing device 104, directly or through one of the components (e.g., the offload engine component 204) can modify or replace software or software configurations associated with one or more components in which a hardware latch permits modification. Illustratively, the host computing device 104 can access memory for obtaining updates, software applications, etc.

At block 558, the offload engine component 204 can initiate a reconfiguration, cleanup, or examination of the computing device resources to ensure that such resources are available for use. In one aspect, the host computing device 104 can initiate a cleanup of data previously stored on hard disks 224. In another aspect, the host computing device 104 can modify or replace software associated with one or more components in which a hardware latch permits modification. In a further aspect, the host computing device 104 can implement various security or authentication schemas. In still another aspect, the offload engine component 204 can initiate a reconfiguration, cleanup, or examination of the computing device resources to ensure that such resources are available for use.

At block 558, the offload engine component 204 can also implement one or more processes for preparing the host computing device 104 for use with the customer specified request. In one aspect, the offload engine component 204 can enable one or more physical or emulated hardware components for utilization. For example, assume a host computing device 104 includes four processing units that are capable of being utilized, but a customer has only indicated they would utilize two processing units. The offload engine component 204 can then enable only two of the processing units responsive to the request.

At block 560, the offload engine component 204 can initiate one or more processes that will be run by the service provider during the time the host computing device 104 resources are being utilized by a customer. For example, the processes can include a health check module for determining the relative health/operation of the host computing device 104. In still a further aspect, the offload engine component 204 can then prepare for the real boot process requested by the CPU 212. At block 562, subroutine 500 terminates.

It will be appreciated by those skilled in the art and others that all of the functions described in this disclosure may be embodied in software executed by one or more processors of the disclosed components and mobile communication devices. The software may be persistently stored in any type of non-volatile storage.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer readable storing the computer executable components such as a CD-ROM, DVD-ROM, or network interface further, the component and/or data can be included in a single device or distributed in any manner. Accordingly, general purpose computing devices may be configured to implement the processes, algorithms, and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A hosting platform comprising:
   a baseboard management controller for initiating a power cycle of a host computing device associated with the baseboard management controller; and
   an offload engine component, implemented on an embedded microprocessor, wherein the offload engine component is operable to:
   communicate with one or more processors associated with the hosting platform in accordance with a peripheral communication protocol;
   prior to implementing a boot process for the hosting platform, cause a first manipulation of one or more hardware latches to permit modifications to software code associated with components of the hosting platform;
   implement at least one management function corresponding to at least of an update to one or more components associated with the components of the hosting platform responsive to the manipulation of the hardware latches;

based on a determination that the boot process is associated with untrusted components of the hosting platform, cause a second manipulation of the one or more hardware latches to prevent modifications to software code associated with components of the hosting platform; and responsive to the implementation of the at least one management function and the second manipulation of the one or more hardware latches, cause the implementation of the boot process associated with untrusted components of the hosting platform.

2. The system as recited in claim 1, wherein the offload engine component is further operable to implement, prior to initiating the boot process for the hosting platform, at least one management function corresponding to establishing a control communication channel.

3. The system as recited in claim 1 further comprising a system basic input/output system component, the system basic input/output system component maintains information that when processed by the one or more processors associated with the hosting platform causes the one or more processors to initiate a boot process via the offload engine component in accordance with the peripheral communication protocol.

4. The system as recited in claim 3, wherein the offload engine component is operable to emulate a boot device in accordance with the peripheral communication protocol.

5. The system as recited in claim 4, wherein the boot device corresponds to a network interface controller.

6. The system as recited in claim 4, wherein the boot device corresponds to a storage device.

7. The system as recited in claim 3, wherein the system basic input/output system component is associated with a hardware latch the controls modifications to at least one of software code or configurations associated with the system basic input/output system component.

8. The system as recited in claim 1, wherein the peripheral communication protocol is the peripheral component interconnect peripheral communication protocol.

9. The system as recited in claim 1, wherein the baseboard management controller is operable to receive commands in accordance with an intelligent platform management interface.

10. The system as recited in claim 1, wherein the offload engine component is further operable to implement, prior to initiating the boot process for the hosting platform, at least one management function corresponding to at least of an modification of one or more attributes of a component associated with the host computing device.

11. The system as recited in claim 1, wherein the hosting platform further includes one or more processing units or a memory, the one or more processing units or memory associated with the host computing device.

12. The system as recited in claim 1, wherein the hosting platform further includes at least one controller, the at least one controller in communication with hard disks associated with the host computing device.

13. The system as recited in claim 12, wherein the at least one controller is associated with a hardware latch the controls modifications to at least one of software code or configurations associated with the controller.

14. The system as recited in claim 1, wherein the hosting platform further includes one or more peripheral devices, the one or more peripheral devices associated with the host computing device.

15. The system as recited in claim 14, wherein the one or more peripheral devices are associated with a hardware latch the controls modifications to at least one of software code or configurations associated with the peripheral devices.

16. The system as recited in claim 14, wherein the one or more peripheral devices includes a graphical processing unit.

17. A hosting platform comprising:
a baseboard management controller for initiating a power cycle of a host computing device associated with the baseboard management controller; and
a management component, implemented on an embedded microprocessor, wherein the management component is operable, responsive to a power cycle initiated by the baseboard management controller, to:
cause a first manipulation of one or more hardware latches to permit modifications to at least one of software code or configurations associated with components of the hosting platform;
prior to implementing a target boot process, implement at least one management function corresponding to one or more components associated with the components of the hosting platform responsive to the manipulation of the hardware latches;
based on a determination that the target boot process is associated with untrusted components, cause a second manipulation of the one or more hardware latches to prevent modifications to at least one of software code or configurations associated with components of the hosting platform; and
implement the target boot process upon completion of the at least one management function and the second manipulation of the one or more hardware latches.

18. The system as recited in claim 17, wherein the management component communicates with one or more processors associated with the hosting platform in accordance with a peripheral communication protocol.

19. The system as recited in claim 17, wherein the management component is further operable to establish a control communication channel.

20. The system as recited in claim 17 further comprising a system basic input/output system component, wherein the system basic input/output system component maintains information that when processed by the one or more processors associated with the hosting platform causes the one or more processors to initiate a boot process via the offload engine component in accordance with the peripheral communication protocol.

21. The system as recited in claim 17, wherein the management component is further operable to implement at least one management function corresponding to at least of an modification of one or more attributes of a component associated with the host computing device.

22. The system as recited in claim 17, wherein the hosting platform further includes one or more processing units or a memory, the one or more processing units or memory associated with the host computing device.

23. The system as recited in claim 17, wherein the hosting platform further includes at least one controller, the at least one controller in communication with hard disks associated with the host computing device.

24. The system as recited in claim 17, wherein the hosting platform further includes one or more peripheral devices, the one or more peripheral devices associated with the host computing device.

25. A management component, implemented on an embedded microprocessor, wherein the management component is operable to:
cause a first manipulation of one or more hardware latches associated with components of a hosting platform to permit modifications to at least one of software code or configurations associated with components of the hosting platform;

cause a delay of an implementation of a boot process by one or more processors associated with the hosting platform;

implement at least one management function corresponding to management of one or more components of the hosting platform responsive to the manipulation of the hardware latches; and based on a determination that software code associated with the boot process is untrusted, cause a second manipulation of the one or more hardware latches to prevent modifications to software code or configurations associated with components of the hosting platform prior to the implementation of the boot process by the one or more processors.

26. The system as recited in claim 25, wherein the management of the one or more components of the hosting platform includes the establishment of a control communication channel.

27. The system as recited in claim 25, wherein the management component causes a delay in the implementation of the boot process by presenting itself as a boot device during a boot process implemented by the host computing device.

28. The system as recited in claim 25, wherein the management component is further operable to implement at least one management function corresponding to at least of an modification of one or more attributes of a component associated with the host computing device.

29. The system as recited in claim 25, wherein the management of the one or more hardware latches corresponds to closing of at least one latch that enables modification to executable code maintained on a component corresponding to the at least one latch.

* * * * *